R. L. WILCOX.
CONNECTION.
APPLICATION FILED MAR. 5, 1915.
1,157,072.
Patented Oct. 19, 1915.
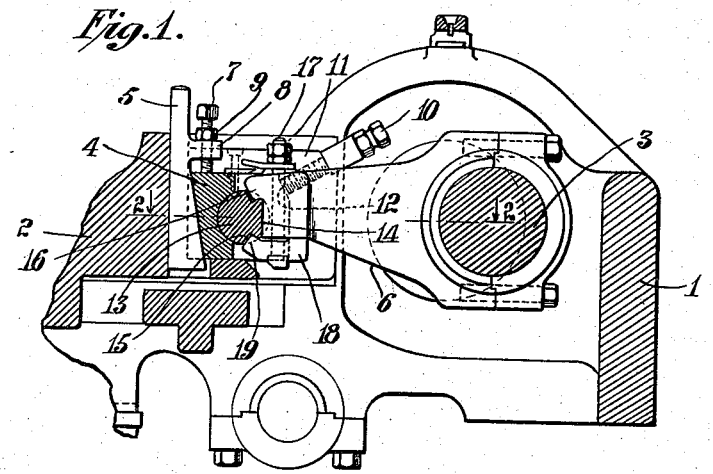
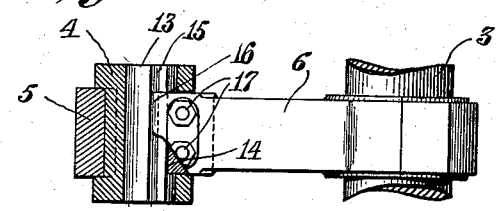
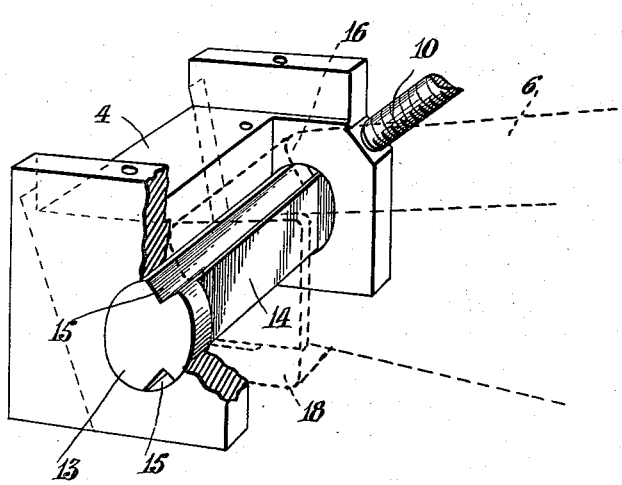

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

CONNECTION.

1,157,072.   Specification of Letters Patent.   Patented Oct. 19, 1915.

Application filed March 5, 1915. Serial No. 12,301.

*To all whom it may concern:*

Be it known that I, RICHARD LESTER WILCOX, a citizen of the United States, residing at Waterbury, in the county of New Haven and State of Connecticut, have invented certain new and useful Improvements in Connections, of which the following is a specification, reference being had therein to the accompanying drawings.

My invention relates to a new and improved connection, having for its object, among other things, to provide simple and rigid means, for joining a pitman with a gate or other member, that will withstand heavy usage and will not be readily disarranged or broken.

To the above and other ends, my invention consists in the connection, having certain details of construction and combinations of parts, as will be hereinafter described, and more particularly pointed out in the claims.

Referring to the drawings in which like numerals of reference designate like parts in the several figures, Figure 1 is a transverse sectional elevation of a machine, showing the pitman and my improved mechanism connected therewith; Fig. 2 is a sectional view of some of the parts, taken upon line 2—2 of Fig. 1; and Fig. 3 is a detail perspective view of my improved device.

This invention is designed to be used upon any machine wherein there is a member movably connected with a pitman, the type thereof, in general use, having the pitman journaled upon a crank shaft and transmitting movement to a reciprocating member, commonly known as a slide or gate. The reciprocating member travels in fixed guide-ways, while one end of the pitman moves in a circular path about the axis of the crank shaft with which it is connected, and the opposite end of the pitman is connected with the reciprocating member so as to have a knuckle or pivotal engagement therewith. Heretofore the mechanism adapted for this purpose has been more or less cumbersome and the parts become loosened and separated by the shock, wear, pounding, and vibration thereon, which latter also causes the metal to crystallize and break off, thus destroying the connection as well as subjecting other parts to injury.

In the drawings, the numeral 1 designates the bed of a machine, 2 the reciprocating gate therein, 3 the crank shaft, 4 the gate block, which is connected with the gate 2, and 5 the wedge that lies between one face of the gate and the gate block, and 6 is the pitman by which motion is transmitted from said crank shaft to said gate.

The position of the gate block on the gate is determined by the position of the wedge 5, which is moved in one direction by the screws 7 threaded through the arm 8 and having a jam nut 9 thereon. The gate block is held against the wedge 5 by the screws 10 that are threaded through the wings 11 upon the gate 2 with their ends impinging against the angular face 12 upon the gate block 4 at such an angle as to exert a downward pressure upon said gate block, thus insuring its constant engagement with the said wedge and the underside thereof with the gate.

Rotatably mounted in the gate block 4 is a shaft 13, having a notch 14 in one side thereof between its ends and parallel longitudinal recesses 15 in the outer surface thereof.

The outer end of the pitman 6 is provided with a lip 16 of substantially the same shape as the notches 15 and into one of which said lip projects. Secured to said pitman by one or more bolts 17 is a clamp plate 18 having a lip 19 thereon of substantially the same shape as the lip 16, and which projects into one of the notches 15 in the shaft 13, substantially as shown in Fig. 1 of the drawing.

By the means above described, the shaft 13 is rigidly secured to the pitman 6 by the plate 18 and the engagement of the lips 16 and 19 with the recesses 15, and as the shaft 13 is journaled in the gate block 4, which is mounted upon the gate 2, it is apparent that a positive and operative connection is formed between said pitman and gate. In one direction, that is, when the gate is moved to the left, as shown in Fig. 1, the strain is taken by the body of the pitman through its engagement at one end with the bottom of the notch 14, at which time there is a continuous mass of metal without a break between the gate and the crank shaft. It is during this movement that the operations of the machine are usually performed and the greatest strain is then placed upon all parts.

During the reverse movement of the gate 2, while the parts are returning for a succeeding operation and no parts are being subject to a strain over and above that necessary to move the metal itself, the lips 16 and 19, by reason of their engagement with the recesses 15 in the shaft 13, draw the gate toward the crank shaft.

In minor details my invention may be modified from that herein shown, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with a pitman; of an independent member; and means for operatively securing said pitman to said independent member, comprising a shaft journaled in said independent member with oppositely disposed longitudinal recesses therein, and a separable member connected with said pitman having an interlocking engagement with the recesses in said shaft.

2. In a device of the character described, the combination with a pitman; of an independent member; and means for operatively securing said pitman to said independent member, comprising a shaft journaled in said independent member, with oppositely disposed longitudinal recesses therein, and having a fixed connection with said pitman by the engagement of a lip upon said pitman with a recess in said shaft.

3. In a device of the character described, the combination with a pitman; of an independent member; means for operatively securing said pitman to said independent member, comprising a shaft having recesses therein journaled in said independent member, and having a fixed connection with said pitman by the engagement of lips thereon with the recesses in said shaft; and means for relatively adjusting the position of one of said lips.

4. The combination with a pitman and an independent member; of means for forming an operative connection therebetween, said means comprising a shaft having longitudinal recesses journaled in said independent member, a lip on said pitman having engagement with one of said recesses; a member having a lip thereon in engagement with one of said recesses; and means for movably connecting the same with said pitman.

5. In a device of the character described, the combination with a pitman, one end of which moves in a rotary path; of an independent member, having a reciprocatory movement; and means for operatively securing said pitman to said independent member at the end thereof opposite to the end moving in the rotary path, said means comprising a shaft journaled in said independent member and having a clamp connection with said pitman.

6. In a device of the character described, the combination with a pitman; of an independent member; and means for operatively securing said pitman to said independent member, comprising a shaft having longitudinal recesses upon opposite sides thereof, said recesses in cross section being wider at the periphery of said shaft than at the bottom thereof, and lip members connected with said pitman that enter said recesses and by their contact therewith hold said shaft rigidly against the end of said pitman.

7. In a device of the character described, the combination with a pitman; of an independent member; and means for operatively securing said pitman to said independent member, comprising a shaft journaled in said independent member having a longitudinal recess in one side thereof and a notch adjacent thereto, and a lip member connected with said pitman and entering said recess when the end of said pitman is in said notch.

8. In a device of the character described, the combination with a pitman, one end of which moves in a rotary path; of an independent member, having a reciprocatory movement; and means for operatively securing said pitman to said independent member at the end thereof opposite to the end moving in the rotary path, said means comprising a shaft, having a separable clamp connection with said pitman whereby it is held against movement in relation thereto and journaled in said independent member.

9. In a device of the character described, the combination with a pitman, one end of which moves in a rotary path; of an independent member, having a reciprocatory movement; and means for operatively securing said pitman to said independent member at the end thereof opposite to the end moving in the rotary path, said means comprising a shaft journaled in said independent member at the opposite ends thereof, and having a clamp connection between its ends with said pitman.

10. In a device of the character described, the combination with a pitman, one end of which moves in a rotary path; of an independent member, having a reciprocatory movement; and means for operatively securing said pitman to said independent member at the end thereof opposite to the end moving in the rotary path, said means comprising a shaft having between its ends a separable clamp connection with said pitman ends and projecting laterally upon the opposite sides thereof and journaled in said independent member.

In testimony whereof I affix my signature in presence of two witnesses.

RICHARD LESTER WILCOX.

Witnesses:
CLIFFORD PETITJEAN,
HOWARD COLEY.